Oct. 21, 1941.   J. MacMANUS   2,259,476
MACHINE FOR TWISTING DOUGH
Filed Aug. 2, 1940

INVENTOR
John MacManus
BY
Cooper, Kerr & Dunham
ATTORNEYS

Patented Oct. 21, 1941

2,259,476

UNITED STATES PATENT OFFICE 2,259,476

MACHINE FOR TWISTING DOUGH

John MacManus, Yonkers, N. Y., assignor to Cushman's Sons Inc., New York, N. Y., a corporation of New York Application August 2, 1940, Serial No. 349,612

5 Claims. (Cl. 107—8)

This invention relates to a machine for twisting strips of dough. Among the objects of the invention is to provide an efficient machine for twisting strips of dough which imparts the full twist in the dough as ultimately used in making coffee rings and like pastries.

Further and other objects of the present invention will be hereinafter set forth in the accompanying specification and claims and demonstrated by the drawing which shows by way of illustration a preferred embodiment and the principle of the invention and what I now consider the best mode in which I have contemplated applying that principle.

Figure 1:
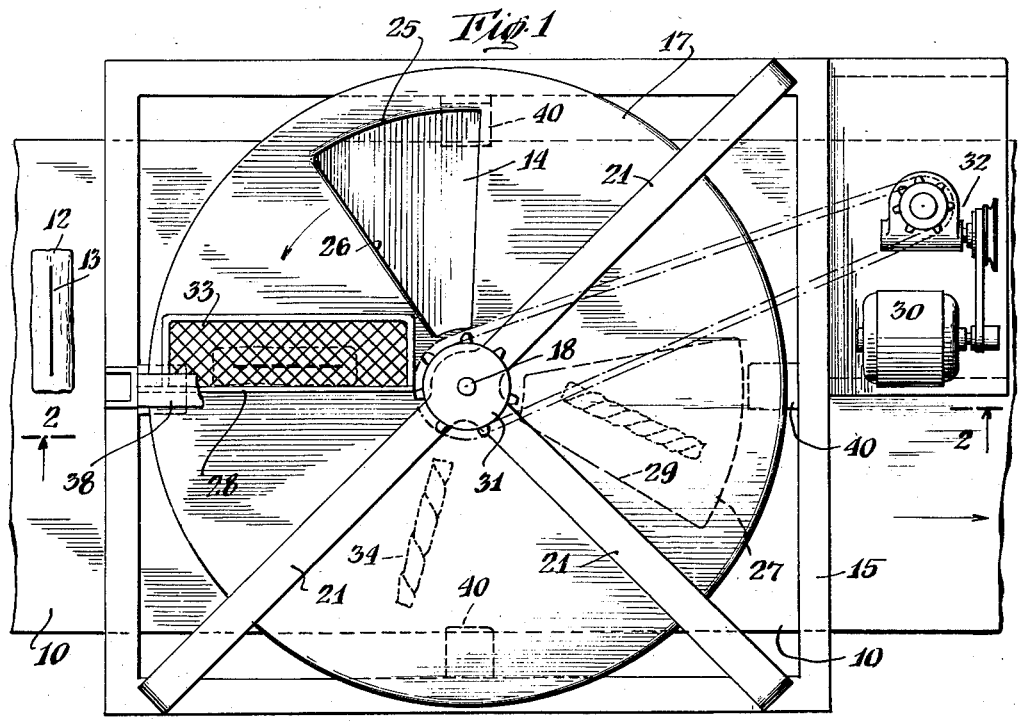
Fig. 1 is a plan of the dough twisting machine.

The dough twisting machine is provided with two parallel plates which are rotated relatively to each other. These plates are spaced from one another sufficiently to accommodate and process the strip of dough to be twisted. The relative rotary motion of the two plates causes rotation of the dough strips and twisting thereof in proportion to the locations along the dough strip from the center of relative rotation of the plates.

Referring to the drawing, the dough twisting machine is mounted above a travelling conveyor in the form of a wide belt 10. The belt is supported by rollers 11. The movement of the belt is coordinated with other manufacturing operations having to do with the preparation of the dough strips before they are ready for the twisting operation.

As shown in Fig. 1, a strip of dough 12 ready for twisting is approaching the twisting machine upon the belt. This strip has been cut to length and width from a long strip of dough of the desired thickness. It is desirable, though not essential, that the dough strip be provided with a longitudinal slit 13 cut entirely through the strip, and, if desired, more than one of these slits may be cut.

The two plates of the dough twisting machine may be made of any suitable material, and wooden plates in the form of disks serve very effectively. While relative rotation between the disks is relied upon for producing the twist in the dough, I have obtained satisfactory results by maintaining one plate stationary and rotating the other plate.

Figure 2:
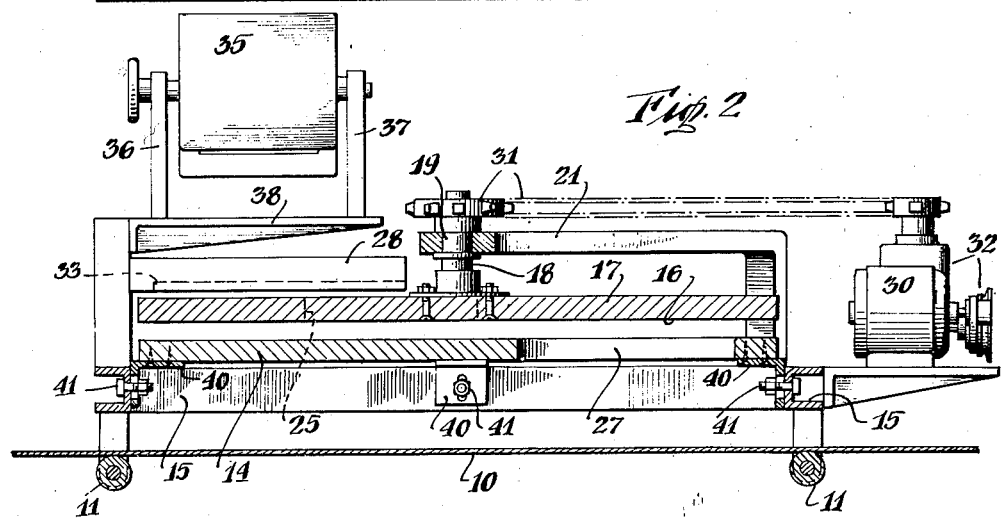
Fig. 2 is a section on line 2—2 of Fig. 1.
Figure 3:
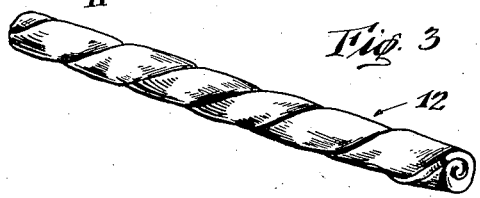
Fig. 3 illustrates a twisted dough product of the machine.

Referring to Fig. 2, it will be seen that the stationary plate 14 is mounted in a horizontal position and is supported on brackets adjustably secured to frame 15. This plate serves as a platform which receives the strip of dough when it is introduced into the machine, and it also serves to provide one of the surfaces which imparts the twist to the dough. The other surface which cooperates with the platform surface for twisting the dough is at the underside 16 of a rotary disk 17. The rotary disk is carried by a vertical shaft 18. This shaft is journalled in a thrust bearing 19 which is carried by the frame elements 21. These frame elements are in the form of three arms which extend radially and are secured to frame 15 which is in turn supported upon a base (not shown).

In the operation of the machine the strips of dough to be twisted are introduced one at a time to the space between the two plates 14 and 17 in such a manner that each will extend substantially radially from the axis of rotation of the rotary plate. For accomplishing this, the rotary plate is provided with an opening 25 which has a dropping off edge 26 extending radially of the plate. Stationary plate 14 has a similar opening 27 which permits the egress of strips of dough from the space between the plates after twisting has been completed. The point of ingress of the strips of dough to the space between the plates is determined by a bar 28 mounted just above rotary plate 17, and the location of the point of egress of the strips of dough from the space between the plates after twisting is completed is determined by the position of the opening 27 in the stationary plate or platform. The angle between the bar 28 and the dropping off edge 29 of opening 27 determines the length of travel of dough between the plates while being twisted and the amount of twist the dough receives. Accordingly, it is desirable to have means for adjusting the position of the fixed platform 14 about the axis of the apparatus so as to position the dropping off edge 29, as desired. The vertical driving shaft 18 is connected to a motor 30 by a sprocket and chain connection 31. Suitable speed controlling mechanism for the motor is provided, as well as reduction transmission 32.

When using the machine the operator stands at the side of the belt 10 which is uppermost in Fig. 1. As the strips of dough 12 approach the machine, the operator picks them from the conveyor 10 and drops them upon the top of the rotating plate 17. The dropping occurs in front of the hand guard 33.

The plate carries the strips against the guide bar 28 which temporarily arrests them, one at a time.

Continued motion of the plate 17 brings the opening 25 to the position of the arrested strip and the passage of the edge 26 by bar 28 permits the strip to drop upon the stationary platform or plate 14 just below. The strip is immediately engaged by the opposite faces of the plates 14 and 17, and as a result of the rotary motion of plate 17 the strip is rolled on its own axis in the path of an arc about the center of rotation of plate 17. Twist is simultaneously imparted to the strip of dough as the result of this movement along the arc because of the differences in linear velocity of particles on the strip in proportion to the radius of their position from the center of the rotating plate. One position of the dough being twisted in its arcuate path of travel is generally illustrated at 34.

The point of egress of the twisted strip from the space between the plates is determined by the foremost edge 29 in the opening 27 in the stationary plate. The twisting action of the plates is discontinued at this point and the twisted dough drops upon the conveyor 10 and is carried away from the machine. For completing the ring it is necessary only that the free ends of the twisted strip be secured to one another.

During the operation of the machine it is desirable that the plates be sprinkled with flour. For this purpose a hopper 35 is provided which is mounted in bearings at the upper ends of standards 36, 37. These standards are carried by a bracket 38 which is mounted upon the box frame 15. The operation of the machine sets up sufficient vibration to cause flour to drop from the hopper upon the rotating plate.

For adapting the machine to twist different kinds of dough and to twist strips of different thicknesses it is desirable to provide means for adjusting the spacing between the plates. I have found it convenient to make provision for raising or lowering the stationary plate. For that purpose the brackets 40 for supporting plate 14 are connected to frame 15 by pin and slot connections including bolts 41.

The horizontal flanges of the brackets are screwed to the plate 14. By changing the points of engagement of the screws with the plate the plate may be adjusted about its axis for determining the rotary position of discharge opening 27.

What is claimed is:

1. A dough twisting machine comprising, in combination, a platform, a rotatable plate mounted for rotation, said rotatable plate having a surface parallel to said platform and facing said platform, said rotatable plate having an aperture therein for the ingress of strips of dough to the space between the rotatable plate and platform, means determining the location of the feed of strips of dough to said opening, said platform also having an opening for the egress of twisted strips of dough from the space between the platform and rotatable plate at a point removed from the location of the feed of the strips of dough so as to cause the relative rotary movement of the facing surfaces of the rotatable plate and platform to twist the strips while being travelled between the plate and platform from the ingress opening to the egress opening, and means for rotating said rotatable plate.

2. A dough twisting machine comprising, in combination, a pair of parallel plates, means for rotating one of said plates in relation to the other, said plates being spaced from each other to provide opposite surfaces on the plates for simultaneously engaging and twisting strips of dough between the surfaces, one of said plates having entrance means providing for the ingress of strips of dough to the space between the parallel plates and the other of said plates having an opening for the egress of strips of dough from the space between the parallel plates after they have been twisted by contact with opposite faces on the respective plates, and means for guiding strips of dough to present them to the space between said plates with their longest axes extending substantially radial of the axis of relative rotation of said plates so as to cause twisting of the strips as they are rolled between the plates.

3. A dough twisting machine comprising, in combination, a pair of plates having parallel faces spaced from each other and providing surfaces between which strips of dough are received and twisted, one of said plates being fixed and having an edge over which twisted strips of dough leave the space between the plates, means for mounting the other of said plates for rotation on an axis perpendicular to the planes of said parallel surfaces, said last named plate having an opening with an edge extending substantially radially from the axis of rotation of said last named plate for the ingress of strips of dough to the space between said plates, and means for determining the moment of passage of a strip of material through the opening in said last named plate.

4. A dough twisting machine comprising, in combination, a pair of plates having parallel faces spaced from each other and providing surfaces between which strips of dough are received and twisted, one of said plates being fixed and having an edge over which twisted strips of dough leave the space between the plates, means for mounting the other of said plates for rotation on an axis perpendicular to the planes of said parallel surfaces, said last named plate having an opening with an edge extending substantially radially from the axis of rotation of said last named plate for the ingress of strips of dough to the space between said plates, means for determining the moment of passage of a strip of material through the opening in said last named plate, and means for adjusting the position of said fixed plate for changing the space between the fixed plate and rotary plate.

5. A dough twisting machine comprising, in combination, a pair of oppositely disposed members having surfaces facing each other, means for mounting said opposing members in spaced relation, means for rotating one of said members with respect to the other so as to twist strips of dough between the facing surfaces, means in one of said members providing for the ingress of strips of dough to the space between the facing surfaces, and means in the other of said members providing for the egress of said strips of dough from the said space between the facing surfaces after they have been twisted as the result of their contact with the relatively rotating surfaces.

JOHN MacMANUS.